United States Patent Office 3,304,269
Patented Feb. 14, 1967

3,304,269
PRODUCTION OF POLYMERS OF EPOXIDE COMPOUNDS USING CATALYTIC PRODUCT OF GROUP VIII METAL CARBONYL WITH AN ALKYL ALUMINUM COMPOUND
Wolfram R. Kroll, Linden, and Alberto Malatesta, Roselle, N.J., assignors to Esso Research and Engineering Company, a corporation of Delaware
No Drawing. Filed July 22, 1963, Ser. No. 296,859
6 Claims. (Cl. 260—2)

This invention relates to a catalyst and a process for the production of polymers of an epoxidized mono-olefinic hydrocarbon, i.e. polymers of an alkylene oxide.

The polymerization of alkylene oxides to solid materials is known in the art, and the products are known to be useful as molding and coating compositions, film forming materials, and as rubbers.

By the present invention, it has been found that alkylene oxides can be polymerized to solid products by means of a novel catalyst composition. This catalyst is prepared by reacting a Group VIII metal carbonyl compound with an alkyl aluminum compound. The solid product which is formed by this reaction is contacted with the alkylene oxide monomer to effect polymerization.

The reaction of the metal carbonyl with the aluminum alkyl proceeds slowly at room temperatures so it is preferred to heat the reaction mixture to temperatures up to about 100° C. Thus, depending on the temperature employed, the reaction time may vary between 30 minutes and several days.

.05 to 1 mole of metal carbonyl may be used per mole of aluminum alkyl although it is preferred to use .1 to .4 mole of metal carbonyl per mole of aluminum alkyl.

The metal carbonyl compound which is useful in this invention is formed from any metal encompassed by Group VIII of the Periodic Table. Thus, iron, nickel, and cobalt are examples of useful metals. Iron is preferred. The metal carbonyl compound is ordinarily formed by reducing a metal salt in the presence of carbon monoxide. Iron carbonyl for example may be prepared by reducing ferrous oxalate in the presence of carbon monoxide. While iron pentacarbonyl is the most preferred compound for the present invention, other iron carbonyls are also useful.

The aluminum alkyl compound of this invention may be represented by the formula $AlRX_2$ where R is any alkyl group and X may be the same or another alkyl group, a halide or a hydride. Preferably the alkyl group should have between 2 and 8 carbon atoms. Representative examples of these aluminum alkyls include, aluminum triethyl, aluminum triisobutyl, aluminum tri-n-butyl, aluminum di-n-butyl hydride, aluminum diethyl chloride, aluminum ethyl propyl chloride, and aluminum ethyl dichloride. Aluminum triethyl is preferred.

The process of the invention is applicable to polymerizing any epoxidized mono-olefinic hydrocarbon—i.e., a hydrocarbon containing an oxirane group. Although the process is especially suited to produce high molecular weight polymers of alkylene oxides, particularly those of 2 to 4 carbon atoms such as ethylene oxide, 1,2-propylene oxide and isobutylene oxide, the process can be used to obtain polymers of any other of the epoxide compounds such as 1,2-butylene oxide, 2,3-butylene oxide, butadiene monoxide, 1,2-pentylene oxide, 2,3-hexylene oxide, 3,4-hexylene oxide, 3-ethyl-2,3-pentylene oxide, 1,2-dodecylene oxide, cyclopentene oxide, cyclohexene oxide, camphene oxide, styrene oxide, benzylethylene oxide, and the like. In being polymers of mono-epoxide compounds, the products of the process are thermoplastic substances.

The process of the invention is executed by bringing the epoxy compound in liquid state into contact with the catalyst. The polymerization reaction may be carried out in the presence of an inert solvent—e.g. an aromatic hydrocarbon (benzene, toluene, xylene, etc.), aliphatic hydrocarbon (isopentane, n-hexane, octane, etc.), chlorinated hydrocarbon (carbon tetrachloride, ethylene dichloride, propylene dichloride, etc.) and the like, or the reaction may be effected without solvent. Use of solvent is a convenient means of handling the catalyst. Various amounts of solvent are suitable such as from about 10% to 100% or more of the epoxide treated.

The temperature at which the reaction is carried out may be from about 0 to 200° C. or higher. Usually temperatures of about 70 to 160° C. are employed. The pressure under which the reaction is conducted is from about atmospheric to 40 or more atmospheres. Since the polymerization reaction occurs in liquid phase, sufficient pressure is employed to keep the epoxide compound in liquid condition regardless of whether an inert solvent is present in the reaction mixture or not. The choice of catalyst, temperature and pressure is an effective means of controlling the intrinsic viscosity (molecular weight) of the resulting polymer.

The process of the invention is executed in a closed reaction vessel in either batch or continuous fashion. The epoxide compound is generally added to the catalyst or to a solution of the catalyst in a solvent, but the addition may be in the reverse order if desired. The mixture of epoxide compound in contact with the catalyst is then allowed to stand or is heated to the desired temperature for a time sufficient to obtain a substantial amount of the polymer. Batch operation is usually conducted by bringing the epoxide compound and catalyst together in a closed reaction vessel wherein the desired polymerization occurs with or without stirring of the reaction mixture. It is convenient to effect the polymerization in continuous fashion with the use of a residence reactor. In such operation, a mixture of the epoxide compound, catalyst and solvent, if used, is charged to a vessel fitted with an external pump connected by pipes to more or less opposite points of a reaction vessel whereby agitation and circulation is provided. After the desired extent of polymerization has occurred, fresh charge material is fed continuously or intermittently to the vessel and substantially corresponding amounts of reaction mixture are withdrawn. A steady state is reached and the desired polymer is produced in continuous fashion. If desired, the external circuit may be fitted with a heat exchanger to take care of the thermal requirements of the system.

The excess or unreacted epoxide compound remaining in the reaction mixture upon completion of the desired extent of polymerization is separated or recovered by distillation. The resulting product is purified by washing with a non-solvent for the polymer, or by dissolving it in a solvent and slowly precipitating it by addition of a non-solvent miscible with the solvent.

To effect polymerization of the alkylene oxides of this invention, a catalytic amount of the reaction product of the metal carbonyl and alkyl aluminum compound is used. This may be determined by routine experimentation. In general about 1 to 20 grams of catalyst (reaction product) per 100 grams of monomer may be used although it is preferred to use 5 to 15 grams of catalyst per 100 grams of monomer.

This invention may be more fully understood by reference to the following examples:

Example 1

A catalyst composition was prepared by reacting two grams of iron pentacarbonyl in 16.9 grams of benzene with 1.2 grams of triethyl aluminum. The reaction was conducted at room temperature and was allowed to proceed for three days. Some gas was evolved and the liquid darkened.

Two grams of this darkened liquid, which contained a reaction product of the iron pentacarbonyl and the triethyl aluminum, were added to 10 ml. of heptane as a solvent. Into this solvent was introduced 17 grams of propylene oxide. The reactants were placed in a sealed vessel which was heated to 70° C. and the polymerization reaction was carried out for 16 hours. After this period of time the vessel was opened, the solvent removed and the solid product was dried in a vacuum oven. There was obtained a 10% conversion to high molecular weight poly(propylene oxide) which had an intrinsic viscosity of 2.3 as determined in benzene at 30° C. The product was rubbery in nature.

Control runs were also made with iron carbonyl in heptane alone and with the aluminum triethyl in heptane alone as catalysts. In these cases only traces or no polymer was obtained, thus demonstrating that it is the reaction product of the components rather than the individual component which is the active catalyst.

*Example 2*

6.1 grams of iron pentacarbonyl were reacted with 3.5 grams of triethyl aluminum in the absence of a solvent. The reactants were heated to a temperature of 80–90° C. for a period of one hour. There was obtained from this reaction a solid and a liquid product. The liquid was mainly a mixture of unreacted triethyl aluminum and iron carbonyl. It showed a negative activity in the polymerization reaction as described in Example 1.

The solid reaction product contained a molar ratio or aluminum to oxygen to iron of 5:5:1. 1.45 grams of this product were slurried in normal heptane and treated as described in Example 1 with 17 grams of propylene oxide at 70° C. for 16 hours.

A solid amorphous polymer was obtained from the reaction vessel which had an intrinsic viscosity of 2.5 in benzene in 30° C. indicating that the polymer was of a high molecular weight (of average molecular weight of about 100,000–200,000). In this example there was obtained a 41% conversion of the monomer to the polymer.

*Example 3*

To demonstrate that the metal alkyl component must be an aluminum alkyl, the following experiment was conducted. Lithium butyl was reacted with iron pentacarbonyl specifically as follows:

2.05 grams iron carbonyl in 13.5 grams heptane were reacted with a solution containing 3.9 grams butyllithium. The reaction is exothermic and the temperature went to over 50° C. Finally the reaction mixture was heated to 65° C. for one half hour. The solvent was then removed and a dark solid was obtained which was used for the subsequent polymerization test. .47 gram of this solid was slurried in n-heptane and treated as described in Example 1 with 17 grams of propylene oxide at 70° C. for 16 hours. No polymerization occurred.

*Example 4*

To further demonstrate that the metal alkyl must be an aluminum alkyl, the following experiment was performed:

2.04 grams iron carbonyl were reacted with 7.45 grams zincdiethyl without solvent. It appeared that first a complex was formed which later dissolved and resulted in a clear, orange colored liquid. This mixture was heated for 1 hour at 60° C. During this time the color of the mixture changed to dark brown. .37 gram of this liquid reaction product was used for a polymerization test with propylene oxide under the conditions described under Example 1. No polymer was found.

*Examples 5 and 6*

To demonstrate that only Group VIII metal carbonyls are operative in this invention, the following experiments were conducted. Molybdenum hexacarbonyl was reacted with aluminum triethyl specifically as follows:

2.66 grams molybdenum-hexacarbonyl were reacted with 6.9 grams triethyl aluminum. No evidence of reaction was seen. The mixture was heated for several hours at 60°, 70° and 80° C. without any noticeable reaction occurring. After this heating there was still undissolved molybdenum-hexacarbonyl present whereas the overstanding liquid had turned dark red. .447 gram of this liquid was used in a polymerization test as described under Example 1. No polymer was found.

Similar negative results were obtained with a reaction product of tungsten carbonyl and aluminum triethyl. Specifically, 3.53 grams tungsten-hexacarbonyl were reacted with 6.9 grams triethyl aluminum at 50° C., 60° C. and 80° C. for several hours. During this time only part of the solid carbonyl seemed to dissolve. The overstanding liquid turned deep orange. .4 gram of the liquid was taken for a polymerization test as described under Example 1. No polymer was found.

While it forms no part of the present invention, it is interesting to note that the catalyst which has been described in this specification is useful not only for the polymerization of olefin oxides but also for the selective hydrogenation of certain unsaturated hydrocarbons. Thus in the presence of this catalyst vinyl cyclohexene will be selectively hyrogenated to ethyl cyclohexene. Similarly a mixture of hexene-1 and cyclohexene can be selectively hydrogenated so that only the hexene-1 is hydrogenated to n-hexane. Additionally, the solid catalyst can be used in the presence of an excess of a metal carbonyl such as iron carbonyl. This is an advantage in reactions wherein hydrogenation of only one functional group has to be carried out, while the other group is complexed. Thus, for example, the iron carbonyl can complex with a particular olefinic group while another olefinic group which is not complexed will be hydrogenated.

This invention has been described in certain specific embodiments thereof; however, it should be understood that these are by way of example rather than by way of limitation and it is not intended that the invention be restricted thereby.

What is claimed is:

1. A process for polymerizing an alkylene oxide compound containing an oxirane group which comprises:
   (a) contacting said alkylene oxide compound with a catalyst in the ratio of about 1 to 20 grams of catalyst per 100 grams of alkylene oxide compound, said catalyst comprising the reaction product of
      (1) a Group VIII metal carbonyl compound, with
      (2) an alkyl aluminum compound, the mole ratio of metal carbonyl to alkyl aluminum being in the range of .05 to 1 and
   (b) recovering the solid polymer product.

2. The process of claim 1 wherein the alkylene oxide has 2 to 4 carbon atoms.

3. The process of claim 2 wherein the metal carbonyl is iron carbonyl.

4. The process of claim 3 wherein the alkyl aluminum compound is triethyl aluminum.

5. The process of claim 4 wherein the alkylene oxide is propylene oxide.

6. The process of claim 5 wherein the iron carbonyl is iron pentacarbonyl.

References Cited by the Examiner

UNITED STATES PATENTS 3,247,270   4/1966   Kirk _____ 252—428

WILLIAM H. SHORT, *Primary Examiner.*

SAMUEL H. BLECH, *Examiner.*

T. PERTILLA, *Assistant Examiner.*